Oct. 21, 1958 G. WINTRISS 2,857,582

SOCKET FOR USE WITH PRINTED CIRCUITS

Filed Dec. 3, 1954

2 Sheets-Sheet 1

INVENTOR.
GEORGE WINTRISS

BY James and Franklin

ATTORNEYS

Oct. 21, 1958 G. WINTRISS 2,857,582

SOCKET FOR USE WITH PRINTED CIRCUITS

Filed Dec. 3, 1954 2 Sheets-Sheet 2

INVENTOR.
GEORGE WINTRISS

BY James and Franklin

ATTORNEYS

Patented Oct. 21, 1958

2,857,582

SOCKET FOR USE WITH PRINTED CIRCUITS

George Wintriss, Carversville, Pa., assignor to Industrial Hardware Manufacturing Co., Inc., New York, N. Y., a corporation of New York Application December 3, 1954, Serial No. 473,021

17 Claims. (Cl. 339—194)

This invention relates to sockets for vacuum tubes and like pronged components, and more especially to sockets for use with printed circuits.

The use of printed circuits has grown rapidly, and as a part of the trend toward mechanization in the manufacture of electronic devices, the use of solder dipping has also grown rapidly. The primary object of the present invention is to generally improve sockets intended for use with printed circuits and solder dipping.

A more specific object is to so design the tail of the socket as to encourage the production of a line of solder formed as a fillet between the printed circuit and the tail, and to discourage the formation of a ball or gob of solder on a part of the tail where it would not spread over and improve the connection to the printed circuit.

A further object of the invention is to so design the socket as to provide a mechanical connection between the socket and the printed circuit independently of and prior to the soldering operation. This connection will withstand a push or a pull of considerable force.

Still another object of the invention is to provide a socket having tails which may be received in mating round holes, instead of rectangular holes. Round holes are less likely to crack the insulation material, compared to rectangular holes. It is also easier and less expensive to make the necessary dies for punching round holes through the insulation material.

To accomplish the foregoing general objects, and other more specific objects which will hereinafter appear, my invention resides in the socket elements, and their relation one to another, as are hereinafter more particularly described in the following specification. The specification is accompanied by drawings in which.

Figure 8:
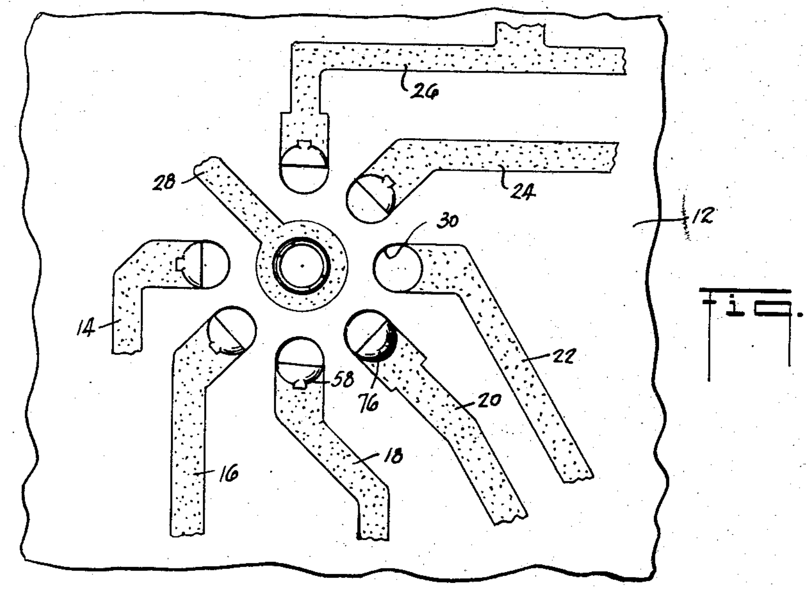
Fig. 8 is a bottom plan view of a portion of a printed circuit at the socket.

Referring to the drawing, and more particularly to Fig. 8, I there show a fragmentary piece 12 of an insulation panel, on the lower side of which an electronics circuit has been printed by known processes. This circuit leads to a vacuum tube, and the printed conductors which are to be connected to the vacuum tube are shown at 14, 16, 18, 20, 22, 24 and 26. The tube here contemplated is a miniature tube with an octal base, that is, there are seven prongs disposed in a circle at the spacing for eight, thus leaving a double space at one point, which insures proper insertion of the tube in the socket. The printed conductor 28 leads through the double space to the center, and is intended for use with a center ground shield. In some circuits the center ground shield and conductor 28 leading thereto may be omitted.

The socket is received and supported in a ring of seven round holes, one of which is shown empty at 30 at the end of conductor 22.

Figure 5:
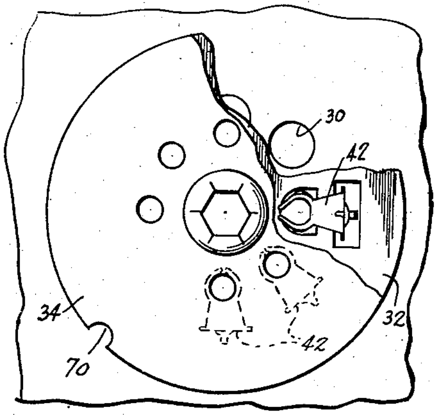
Fig. 5 is a plan view of the socket disposed over an insulation chassis carrying a printed circuit.
Figure 6:
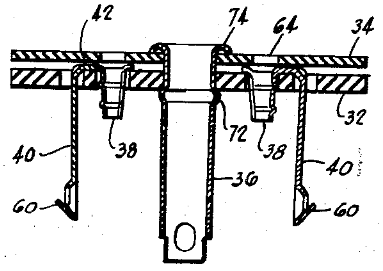
Fig. 6 is a transverse section taken diametrically of the socket.

The general nature of the socket will be clear from Fig. 6, the socket being a laminated socket comprising a lower wafer of insulation 32, and an upper wafer 34, between which metal contacts are secured. The contacts are disposed in a ring, but for simplicity only two of the contacts are shown in Fig. 6, along with a tubular center ground shield 36. The contacts each comprise a generally upright pin grip portion 38, a generally upright tail portion 40, which is preferably substantially longer than the pin grip portion 38, and a generally horizontal bridge portion 42 which connects the top of the pin grip portion 38 to the top of the tail portion 40. The lower end of the tail portion is shaped to be received with a snap fit in one of the circular holes (30 in Figs. 5 and 8), thus putting the socket and printed circuit panel 12 in the relation shown in Fig. 7. The chassis is later dipped in molten solder, resulting in fillet-like soldered connections, one of which is shown at 44 between conductor 22 and the tail 40.

The metal contact may be described in greater detail with reference to Figs. 1, 2 and 3 of the drawing. As before, there is a pin grip portion 38 and a tail portion 40 connected by a bridge portion 42. The pin grip portion may be of any desired type, that here shown being of the split sleeve type, with the split or opening shown at 46. The sleeve may be provided with beads or channels 48 (Fig. 2) to help stiffen the same and to insure proper full insertion of a tube prong provided with a pair of nibs 50 which are appropriately dimensioned and located to be received between the wafers, and thus to support the sleeve at a point opposite the bridge 42 when a tube prong is inserted or removed.

Figure 3:
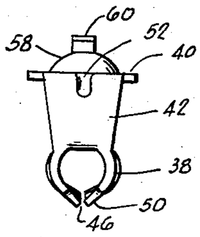
Fig. 3 is a plan view of the same.

The bridge portion 42 may be of somewhat trapezoidal configuration, as is best shown in Fig. 3. This makes possible the use of a tail 40 of substantial width, while at the same time keeping the pin grip portion small enough to be used in a miniature tube socket. This will be understood from inspection of Fig. 5, in which it will be seen that the bridge portions 42 are disposed radially, making possible a greater width at larger radius.

Figure 2:
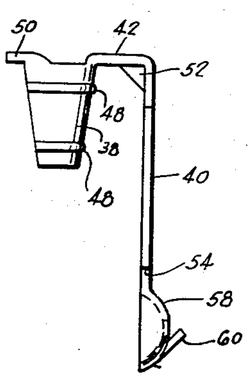
Fig. 2 is a side elevation of the same.

The metal of the contact is preferably indented to form a diagonal channel 52, as shown in Figs. 2 and 3 of the drawing, this acting as a strut to better fix the angle between the bridge portion 42 and the tail portion 40.

Figure 1:
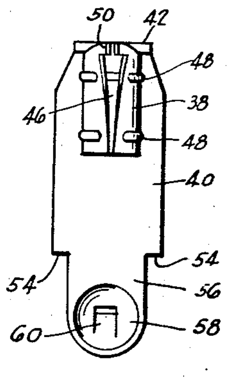
Fig. 1 is a front elevation of a metal contact embodying features of my invention.

Near its lower end the side edges of the tail portion are stepped inward or narrowed to provide shoulders 54, best shown in Fig. 1. These limit the insertion of the tail portion into the hole in the printed circuit. The resulting narrowed part 56 of the tail is convexed outward, as shown at 58. In the species here shown the outwardly convexed part conforms generally to a part of the surface of a sphere, and is adapted for use with a round hole. The lower portion of the convexed part 58 is struck outwardly to form an upwardly directed tang 60 which holds the contact against upward movement from the printed circuit. It will be understood that the vertical distance between the shoulders 54 and the upper edge of the tang 60 preferably corresponds to the thickness of the printed panel (plus some slight additional clearance).

Figure 4:
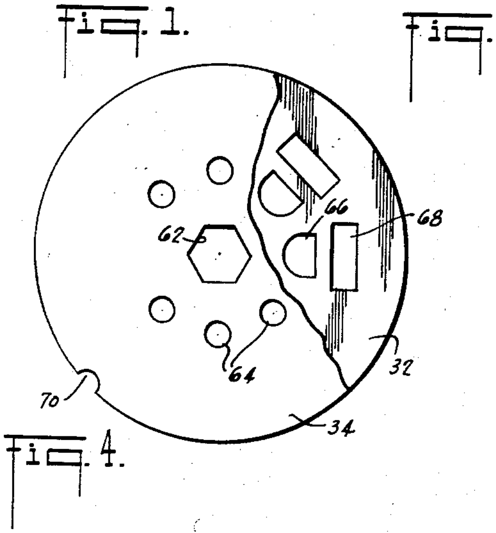
Fig. 4 is a plan view of the laminations or wafers of insulation which carry the contacts.

The insulation wafers of the socket are best shown in Fig. 4. The upper wafer 34 has a single center hole 62 and a ring of small round holes 64. These are disposed on the radius of the circle of the prongs of the vacuum tube, and are dimensioned to readily receive the prongs, there being seven such holes at the spacing of eight. The lower wafer 32 has a center hole registering with the hole 62, and has two concentric rings of holes. The inner holes 66 are shaped to receive the pin grip portions 38 of the contacts. The outer holes 68 are shaped to receive the tail portions. Thus the lower wafer 32 may be loaded with seven contacts dropped into position from above, following which the top wafer 34 may be added.

To insure proper registration of the top and bottom wafers they may be provided each with a peripheral notch or indentation shown at 70. The wafers may be somewhat diamond-shaped and held together by two small eyelets at the corners, but in the present case and preferably, the wafers are circular and are held together by a single eyelet at the center. In order to help maintain registration of the wafers, the hole 62 is preferably non-circular, (in the present case hexagonal), and the same applies to the hole in the lower wafer 32. The eyelet might be similarly flat sided, but in practice a round eyelet may be used because when the eyelet is driven or flanged there is a natural expansion of the body portion of the eyelet, which then assumes a somewhat hexagon shape, and thereby helps maintain the upper and lower wafers in registration.

Figure 7:
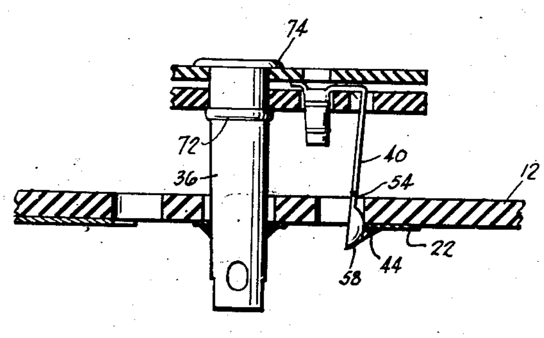
Fig. 7 is a fragmentary section similar to Fig. 6, but showing the socket applied to a chassis or panel carrying a printed circuit.

When a center shield is provided it may act also as the center eyelet for the socket. This is shown in Figs. 6 and 7, in which it will be seen that the center shield 36 is tubular, and is provided near its upper end with an outwardly pressed ridge or bead 72. The upper end of the shield is inserted through the wafers, and is then expanded outward or flanged, as shown at 74. In this case, as with an ordinary short eyelet, there is an expansion of the body portion during the eyeletting operation.

It will be understood that the socket is readily applied to the printed chassis by simply pressing it into position from above. The tail portions enter the holes as far as permitted by the shoulders 54, at which time the tangs slip outward beneath the chassis, thus anchoring the socket securely in position even without the subsequent soldering operation, although the latter greatly strengthens the mounting of the socket.

Because of the spherical configuration of the convexed portion 58 of the tail it conforms to the outline of the hole in which the tail is inserted. During the solder dipping operation a crescent-shaped fillet of solder forms between the printed conductor and the tail, as is best shown at 76 in Fig. 8. It will be understood that for the sake of illustration Fig. 8 is somewhat unrealistic in showing an empty hole at 30, and a soldered connection at 76, when in practice the holes are all simultaneously empty, or occupied, or soldered.

One advantage of the present socket is in providing a long intimate line of contact between the spherically convexed portion 58 and the hole receiving the same. To most readily insure this result the top of tang 60 (Fig. 2) is located at the height of the center of the spherical surface, and the diameter of the spherical surface corresponds to the diameter of the round hole 30. This encourages the formation of a long line of solder between the printed conductor and the contact. Another advantage is that there is only a negligible projection of the tail beyond or below the hole, so that there is no tendency to form a lump or gob of solder at the lower end of the tail out of reach of the printed conductor. The curved and tapered configuration of the small bit of tail located below the printed conductor also helps insure this desired result.

Figure 9:
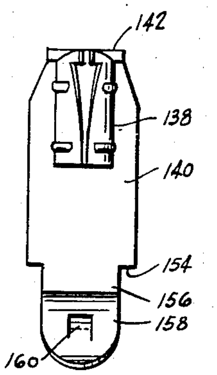
Fig. 9 is a front elevation of a modified contact for use with a rectangular hole.
Figure 10:
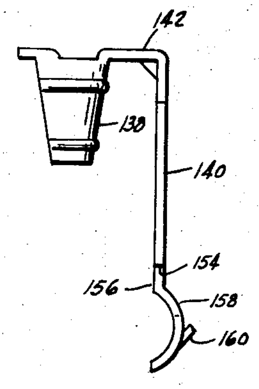
Fig. 10 is a side view thereof.
Figure 11:
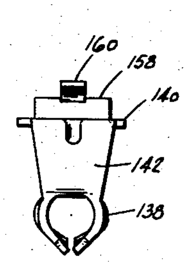
Fig. 11 is a plan view thereof.
Figure 12:
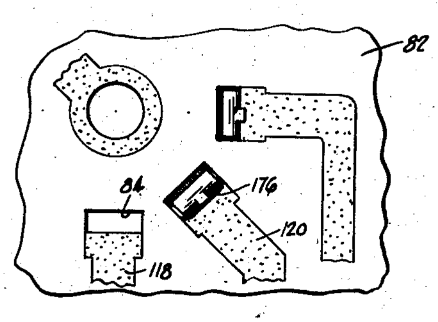
Fig. 12 is a fragmentary bottom view of a printed circuit having rectangular holes, and receiving the metal contact of Figs. 9–11.

I consider the ability to use the present socket with round holes to be a distinct advantage of the invention. However, some manufacturers of electronic equipment may prefer to use or may be already tooled up with dies making rectangular holes. Thus, referring to Fig. 12, the fragment of printed circuit panel corresponds to a part of the panel shown in Fig. 8, but the holes are rectangular, as shown by the hole 84 at the end of conductor 18. Such manufacturers may be suplied with a socket much like that previously described, but slightly modified at the lower ends of the tail portions. The modified contact used may be described with reference to Figs. 9, 10 and 11 of the drawing, in which I show a contact having a pin grip portion 138 and a tail portion 140 connected by a bridge portion 142. The pin grip portion here shown is like that previously described in every detail, and similar remark applies to the bridge portion 142. The tail portion 140 is similarly shouldered at 154 to provide a narrowed portion 156, and the latter is convexed outwardly at 158. The lower part of the convexed portion is struck outwardly to provide a tang 160.

The significant difference in the present contact is that the convexed portion 158 is made to conform generally to the surface of a cylinder having a horizontal axis, thus adapting it for use with a rectangular hole. It will be understood that as before, the vertical spacing between the shoulders 154 and the upper end of the tang 160 is slightly greater than the thickness of the printed panel with which the socket is to be used. Thus the socket may be inserted as far as permitted by the shoulders, whereupon the tangs spring outwardly and help anchor the socket in position. After the solder dipping process a relatively long line of solder is formed, as shown at 176 in Fig. 12, and this takes the form of a fillet of solder between the tail and the conductor 120. However, the solder line is straight rather than crescent-shaped.

Here again the top of the tank 160 (Fig. 10) is preferably at the height of the axis of the cylinder. It could be slightly higher, but preferably it should not be lower. Here also the downward projection of the tail beyond the printed conductor is so small as not to encourage the formation of a lump or gob of solder located below, instead of spread out on, the printed conductor. Once more it may be pointed out that for improved illustrative purposes Fig. 12 has been made unrealistic in showing one hole unoccupied, another occupied, and still another soldered, whereas in practice all are occupied simultaneously and soldered simultaneously.

It is believed that the construction and method of use of my improved socket, as well as the advantages thereof, will be apparent from the foregoing detailed description. It will also be apparent that while I have shown and described the invention in several preferred forms, changes may be made without departing from the scope of the invention, as sought to be defined in the following claims.

I claim:

1. A contact for a socket of the type used to receive vacuum tubes, said socket being intended for use with a printed circuit board, said contact comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward and provided with an outwardly struck, upwardly directed tang located below the aforesaid shoulders to hold the contact against upward movement from the printed circuit board, at least a part of the convexed portion being located between the shoulders and the tang.

2. A contact for a socket of the type used to receive vacuum tubes, said socket being intended for use with a printed circuit board, said contact being formed of a single piece of metal and comprising a generally upright pin grip portion, a generally upright tail portion which is longer than the pin grip portion, and a generally horizontal bridge portion connecting the top of the pin grip portion to the top of the tail portion, said contact being indented to form a diagonal channel acting as a strut to better fix the angle between the bridge portion and the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward and provided with an outwardly struck, upwardly directed tang located below the aforesaid shoulders to hold the contact against upward movement from the printed circuit board, at least a part of the convexed portion being located between the shoulders and the tang.

3. A contact as defined in claim 1, in which the outwardly convexed portion at the lower end of the tail conforms generally to a part of the surface of a sphere and is adapted for use with a round hole in the printed circuit.

4. A contact as defined in claim 1, in which the outwardly convexed portion at the lower end of the tail conforms generally to the surface of a cylinder having a horizontal axis, and is adapted for use with a rectangular hole.

5. A laminated socket of the type used to receive vacuum tubes, said socket being intended for use with a printed circuit board, said socket comprising a bottom wafer having two concentric rings of holes, a top wafer having a ring of holes to receive the pins of a vacuum tube or other pronged unit, and a ring of metal contacts anchored between said wafers, each of said contacts being formed of a single piece of metal and comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward below the aforesaid shoulders, the pin grip and tail portions being passed downwardly through the holes in the lower wafer with the bridge portions disposed radially between said wafers, and means securing said wafers together.

6. A laminated socket of the type used to receive vacuum tubes, said socket being intended for use with a printed circuit board, said socket comprising a bottom wafer having two concentric rings of holes, a top wafer having a ring of holes to receive the pins of a vacuum tube or other pronged unit, and a ring of metal contacts anchored between said wafers, each of said contacts being formed of a single piece of metal and comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being provided with an outwardly struck, upwardly directed tang located below the aforesaid shoulders to hold the contact against upward movement from the printed circuit board, the pin grip and tail portions being passed downwardly through the holes in the lower wafer with the bridge portions disposed radially between said wafers and means securing said wafers together.

7. A laminated socket of the type used to receive vacuum tubes, said socket being intended for use with a printed circuit board, said socket comprising a bottom wafer having two concentric rings of holes, a top wafer having a ring of holes to receive the pins of a vacuum tube or other pronged unit, and a ring of metal contacts anchored between said wafers, each of said contacts being formed of a single piece of metal and comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward and provided with an outwardly struck, upwardly directed tang located below the aforesaid shoulders to hold the contact against upward movement from the printed circuit board, at least a part of the convexed portion being located between the shoulders and the tang, the pin grip and tail portions being passed downwardly through the holes in the lower wafer with the bridge portions disposed radially between said wafers and means securing said wafers together.

8. A laminated socket of the type used to receive vacuum tubes, said socket being intended for use with a printed circuit board, said socket comprising a bottom wafer having two concentric rings of holes, a top wafer having a ring of holes to receive the pins of a vacuum tube or other pronged unit, and a ring of metal contacts anchored between said wafers, each of said contacts being formed of a single piece of metal and comprising a generally upright pin grip portion, a generally upright tail portion which is longer than the pin grip portion, and a generally horizontal bridge portion connecting the top of the pin grip portion to the top of the tail portion, said contact being indented to form a diagonal channel acting as a strut to better fix the angle beween the bridge portion and the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward and provided with an outwardly struck, upwardly directed tang located below the aforesaid shoulders to hold the contact against upward movement from the printed circuit board, at least a part of the convexed portion being located between the shoulders and the tang, the pin grip and tail portions of said contacts being passed downwardly through the holes in the lower wafer with the bridge portions disposed radially between said wafers and means securing said wafers together.

9. A laminated socket of the type used to receive vacuum tubes, said socket being intended for use with a printed circuit board, said socket comprising a bottom wafer having two concentric rings of holes, a top wafer having a ring of holes to receive the pins of a vacuum tube or other pronged unit, and a ring of metal contacts anchored between said wafers, each of said contacts being formed of a single piece of metal and comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward and provded with an outwardly struck, upwardly directed tang located below the aforesaid shoulders to hold the contact against upward movement from the printed circuit board, at least a part of the convexed portion being located between the shoulders and the tang, the pin grip and tail portions of said contacts being passed downwardly through the holes in the lower wafer with the bridge portions disposed radially between said wafers and means securing said wafers together, said means being a tubular ground shield the upper end of which is shaped to act as an eyelet.

10. A socket as defined in claim 5, in which the convexed portion at the lower end of the tail of each of the contacts conforms to a part of the surface of a sphere for use with a round hole in the printed circuit.

11. A socket as defined in claim 7, in which the convexed portion at the lower end of the tail of each of the contacts conforms to a part of the surface of a sphere for use with a round hole in the printed circuit.

12. A socket as defined in claim 9, in which the convexed portion at the lower end of the tail of each of the contacts conforms to a part of the surface of a sphere for use with a round hole in the printed circuit.

13. A socket as defined in claim 5, in which the convexed portion at the lower end of the tail of each contact conforms to a part of a cylinder having a horizontal axis, for use with a rectangular hole in the printed circuit.

14. A socket as defined in claim 7, in which the convexed portion at the lower end of the tail of each contact conforms to a part of a cylinder having a horizontal axis, for use with a rectangular hole in the printed circuit.

15. A socket as defined in claim 9, in which the convexed portion at the lower end of the tail of each contact conforms to a part of a cylinder having a horizontal axis, for use with a rectangular hole in the printed circuit.

16. A contact for a socket of the type used to receive vacuum tubes, said socket being intended for use with a printed circuit board, said contact comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward below the aforesaid shoulder, said outward convexed portion conforming generally to a part of the surface of a sphere and being adapted for use with a round hole in the printed circuit board.

17. A contact for a socket of the type used to receive vacuum tubes, said socket being intended for use with a printed circuit board, said contact comprising a generally upright pin grip portion, a generally upright tail portion which is longer than the pin grip portion, and a generally horizontal bridge portion connecting the top of the pin grip portion to the top of the tail portion, the lower end of said tail portion being stepped inward or narrowed relative to the upper part of said tail portion in order to provide shoulders located below the pin grip portion which limit the insertion of the tail portion into a mating hole in the printed circuit board, the narrowed part of said tail portion being convexed outward below the aforesaid shoulder, said outwardly convexed portion conforming generally to the surface of a cylinder having a horizontal axis, and being adapted for use with a rectangular hole in the printed circuit board.

References Cited in the file of this patent

UNITED STATES PATENTS

| | | |
|---|---|---|
| 1,944,517 | Knutson | Jan. 23, 1934 |
| 2,017,940 | Bessey | Oct. 22, 1935 |
| 2,239,451 | Stearns | Apr. 22, 1941 |
| 2,361,448 | Beal | Oct. 31, 1944 |
| 2,519,121 | Del Camp | Aug. 15, 1950 |
| 2,581,967 | Mitchell | Jan. 8, 1952 |
| 2,613,244 | Del Camp | Oct. 7, 1952 |
| 2,705,788 | Soreng | Apr. 5, 1955 |

FOREIGN PATENTS

| | | |
|---|---|---|
| 711,016 | Great Britain | June 23, 1954 |